Figure 1:
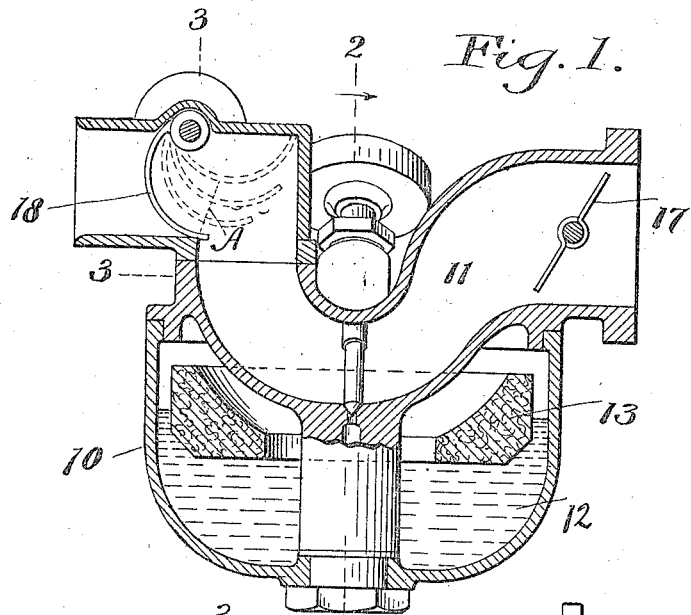

J. A. WILLIAMS.
CARBURETER.
APPLICATION FILED FEB. 9, 1912.

1,194,454.

Patented Aug. 15, 1916.

Witnesses:
E. B. Gilchrist.
H. C. Sullivan.

Inventor:
Joseph A. Williams
by
Thurston & Kwis
Attys.

UNITED STATES PATENT OFFICE.

JOSEPH A. WILLIAMS, OF CLEVELAND, OHIO, ASSIGNOR TO THE K-W IGNITION COMPANY, OF CLEVELAND, OHIO, A CORPORATION OF OHIO.

CARBURETER.

1,194,454.      Specification of Letters Patent.     Patented Aug. 15, 1916.

Application filed February 9, 1912. Serial No. 676,511.

*To all whom it may concern:*

Be it known that I, JOSEPH A. WILLIAMS, a citizen of the United States, residing at Cleveland, in the county of Cuyahoga and State of Ohio, have invented a certain new and useful Improvement in Carbureters, of which the following is a full, clear, and exact description.

This invention relates to improvements in carbureters, and has for its object to provide a carbureter which maintains the mixture supplied to the engine cylinders of the desired and proper richness in gasolene, regardless of the speed of the engine, or of the position of the throttle valve.

At the present time, carbureters are provided with a main or with an auxiliary air valve which admits air to the mixing chamber, and the movement of the valve away from the valve seat is opposed or resisted by a spring or equivalent device whose tension or resisting force varies in accordance with the extent of valve movement. It has been proposed also to employ for the purpose of opposing the opening movement of the valve a plurality of springs or weights which are successively brought into action as the valve is opened, so as to increase the resisting force gradually or progressively. However, none of these devices have proven entirely satisfactory, for it has been found impossible (or extremely difficult) to provide springs or weights whose movement resisting force varies in the right proportion to the movement of the valve to maintain the mixture always at the desired richness of gasolene, as the throttle valve is being opened or closed. In fact, with the carbureters in use at the present time, if the mixture is of the right richness at low speeds, it is generally too thin at higher speeds, or if it is of the right richness with the throttle valve wide open, the mixture is too rich when the engine is throttled down.

In the attainment of the object above mentioned, I depart from the usual, if not general practice in carbureter construction, by employing a valve opposing force which is of constant or of substantially constant value for resisting the movement of the valve away from its seat and by controlling the valve when the air pressure varies so as to obtain proper valve movement to secure proper mixture at any engine speed, by some feature of construction which varies the leverage through which one of the two opposing forces acts, that is the force tending to open the valve and the force opposing the opening movement. I prefer to employ a spring for resisting or opposing the movement of the valve, which spring is under constant tension throughout the limits of valve movement, and while the variation of effective leverage of one of the two forces may be secured in different ways, I prefer to vary the leverage of the air pressure, and this may be accomplished by giving the valve a shape such that the effective surface area acted upon by the air pressure, varies as the valve is being opened or closed, in which event the curvature or shape of the valve may be so selected that regardless of the position of the throttle valve, and the speed of the engine, the valve is opened the proper amount to admit the proper amount of air and at the same time to preserve the proper vacuum in the mixing chamber necessary to draw a sufficient amount of fuel through the spray nozzle to properly enrich the air admitted. In other words, the shape of the valve is such as to maintain the desired relation between air and fuel in the mixture supplied to the cylinders.

My invention may be further briefly summarized as consisting in certain novel details of construction and combinations and arrangements of parts which will be described in the specification and set forth in the appended claims.

Figure 2:
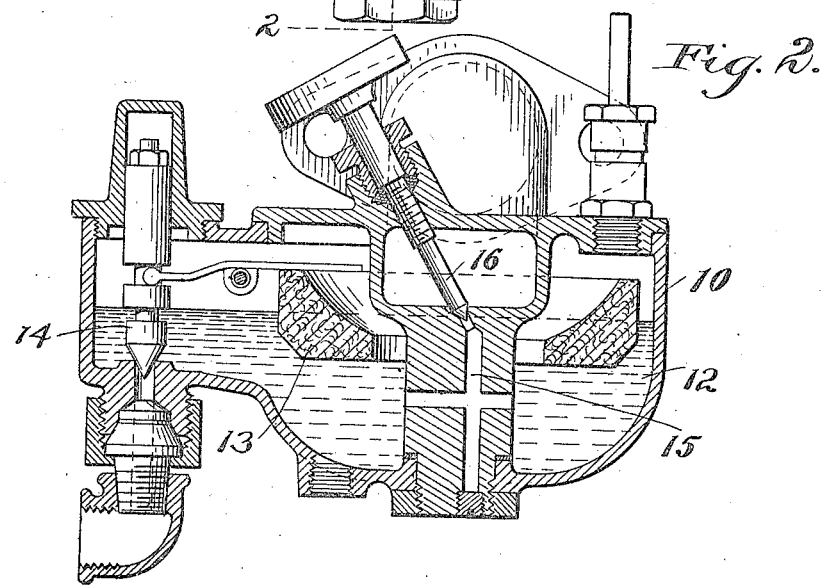
Figure 3:
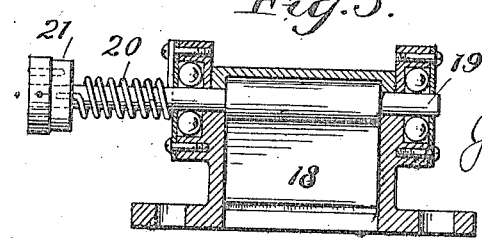

In the drawings, wherein I have shown one embodiment of my invention, Figure 1 is a vertical sectional view through a carbureter equipped with my invention. Fig. 2 is a vertical sectional view substantially along the line 2—2 of Fig. 1, looking in the direction indicated by the arrow; and Fig. 3 is a vertical sectional view substantially along the line 3—3 of Fig. 1, showing particularly the air valve, the valve spring and the valve mounting.

Referring now to the drawings, 10 represents, as a whole, my improved carbureter which is provided with a mixing chamber 11 and a gasolene chamber 12 containing in the usual manner a float 13 having a connection with a valve 14 which controls the passage of gasolene from the gasolene supply to the chamber 12. The passage of gasolene to the mixing chamber takes place through a passageway 15, the flow of gasolene being controlled in the usual way by an adjustable needle valve 16.

Near one end of the mixing chamber 11 is a throttle valve 17 which may be of the usual or any suitable construction, and near the opposite end of the mixing chamber is an air valve 18 which, together with certain parts connected thereto, forms the principal feature of the present invention. In the embodiment of my invention shown in the drawing, this valve 18 is in the form of a pivoted flap valve which is secured to a small horizontal spindle or rock shaft 19, which, in turn is supported on bearings contained in raceways carried by the casing for the valve. This valve is adapted to be swung inwardly to admit air to the mixing chamber by air pressure on its outer surface, or, by the difference in air pressure on its inner and outer surfaces produced by atmospheric pressure on its outer surface and by the reduced pressure on its inner surface due to the partial vacuum in the mixing chamber created by suction of the engine cylinders. In accordance with the present invention, I employ for opposing the movement of the valve away from its seat or from its closed position, a spring 20, whose tension is substantially and for all practical purposes constant throughout the range of movement of the valve. I may employ either a coil spring or a spiral spring, but in this case, I have shown a coil spring, one end of which is secured to an adjustable member 21 at an outer projecting end of the spindle 19, and the other end of which is secured to a relatively stationary part. I provide a sufficiently large number of convolutions in the spring 20 to cause the spring to have substantially constant tension between the extreme movements of the valve.

In order that the valve may be always opened the proper amount although opposed by the spring of constant tension, to admit the proper volume of air to the mixing chamber and to provide a mixture of required richness in gasolene, irrespective of the speed of the engine, or of the position of the throttle valve 17, I provide means whereby the effective leverage through which the air pressure on the outer face of the valve operates, decreases as the valve is being opened, and increases as the valve is being closed. With the type of valve here shown, I accomplish this result by so shaping the valve or its outer surface exposed to the air pressure that its effective surface area on which the air pressure is exerted is decreased as the valve is being opened and increased as the valve is being closed. The valve shown in the drawing is inwardly curved from the supporting spindle 19 to its free end, and, as shown, the curve is substantially that of an involute.

However, I do not claim that the valve should assume the form of an involute, nor in fact, that it is any part of a regular or mathematical curve.

In Fig. 1, the valve is shown by full lines in its closed position, and by dotted lines in its extreme open position, and in two intermediate positions. It will be seen that when the valve is in its closed position, the air pressure or excess of air pressure on its outer surface over that on its inner surface acts on substantially the entire outer surface of the valve, and in such event, the leverage through which the air pressure acts is a maximum. However, as the suction and partial vacuum in the mixing chamber increases and the air valve swings inwardly, the free lower end of the valve dips more and more into the rarefied space beyond the narrowest point of the valve opening or beyond what may be termed the line of restriction indicated by line A in Fig. 1, and consequently the effective surface area upon which the air pressure is exerted decreases, and in consequence the effective leverage of air pressure decreases. When the valve is in its full open position, the effective surface area and effective leverage is a minimum. It will be seen therefore that the effect of the force of pressure tending to open the valve and tending to overcome the constant force or pressure of the spring can be varied at any and all positions of the valve by varying the shape of its outer surface exposed to the air pressure. Hence in accordance with my invention, I provide a valve whose shape or curvature is such that the valve, although opposed in its movements by a spring of constant tension, will for all positions of the throttle valve 17, or for all engine speeds, admit proper volumes of air to produce a mixture which is at all times of the proper richness in gasolene. This mixture I desire to be of substantially constant richness in gasolene, although not of precisely constant mixture, for at low speeds, when due to imperfect cylinder scavenging, burnt gases form a larger percentage of the cylinder contents than at high speeds, the mixture should be slightly richer in gasolene than at high speeds.

It will be understood that the shape of the valve is such that at any position of the throttle valve, the proper and desired relation between the air admitted and the degree of vacuum in the mixing chamber is maintained. The precise shape of the valve will depend upon the type of engine and its characteristics, with reference particularly to scavenging or compression. If the tension of the spring is varied by adjusting the member 21, the needle valve 16 should be adjusted to maintain the desired relation between air admitted and the vacuum maintained in the mixing chamber. It is to be understood, however, that for a certain tension of the spring, and for a certain needle valve adjustment, the curvature of the valve determines the ratio of air and vacuum or fuel supplied, throughout the range of movement of said valve.

Having thus described my invention, what I claim is:

1. In a carbureter, a mixing chamber having a movable air valve adapted to be opened by the force of air pressure, a spring having a substantially constant tension throughout the range of movement of the valve and acting on said valve for opposing the opening movement, the force of air pressure acting through an average leverage, which varies substantially uniformly with the movement of the valve.

2. In a carbureter, a mixing chamber having a movable air valve adapted to be opened by air pressure, means acting on said valve with a force which remains substantially the same throughout the range of valve movement for opposing the opening valve movement, said valve being so shaped that the average leverage through which the force of air pressure acts diminishes at a rate sufficient to cause the proper ratio between the air admitted and vacuum maintained in the mixing chamber for any engine speed.

3. In a carbureter, a mixing chamber having a gasolene orifice and having an air valve adapted to be opened by the force of air pressure, a spring for opposing the opening movement of the valve, said spring having a substantially constant opposing action throughout the range of movement of the valve, the valve being so shaped that the effective surface area subjected to air pressure varies as the position of the valve varies, so that at any speed of the engine, the valve will establish the proper ratio between air admitted and vacuum maintained in the mixing chamber.

4. In a carbureter, a mixing chamber having a gasolene orifice and having a pivoted air valve adapted to be swung about an axis by the force of air pressure, a spring of substantially constant tension throughout the range of movement of the valve for opposing the opening movement, said valve having a convex curvature on its outer face, the curved face being so formed that as the valve is being opened, the free end of the valve dips into the rarefied space in the mixing chamber and the effective surface area subjected to the air pressure decreases at a rate such that at any engine speed, the valve will maintain the proper relation between air admitted and the vacuum in the mixing chamber.

In testimony whereof, I hereunto affix my signature in the presence of two witnesses.

JOSEPH A. WILLIAMS.

Witnesses:
H. R. SULLIVAN,
A. F. KWIS.